(12) United States Patent
Tabacchiera

(10) Patent No.: US 7,919,539 B2
(45) Date of Patent: Apr. 5, 2011

(54) CONCENTRATE OF POLYFUNCTIONAL COMPOUNDS USABLE FOR THE PREPARATION OF FOAMED POLYESTER MATERIALS

(75) Inventor: Alessandro Tabacchiera, Anagni (IT)

(73) Assignee: Point Plastic S.R.L., Colleferro (IT)

( * ) Notice: Subject to any disclaimer, the term of this patent is extended or adjusted under 35 U.S.C. 154(b) by 451 days.

(21) Appl. No.: 12/153,834

(22) Filed: May 27, 2008

(65) Prior Publication Data
US 2009/0005465 A1 Jan. 1, 2009

(30) Foreign Application Priority Data

Jun. 27, 2007 (IT) .............................. MI2007A1286

(51) Int. Cl.
*C08J 9/22* (2006.01)
*C08J 9/00* (2006.01)

(52) U.S. Cl. .......... 521/81; 521/134; 521/138; 521/139; 521/182; 521/97; 524/513; 525/177; 525/437; 525/444; 525/445

(58) Field of Classification Search .................... 521/81, 521/97, 134, 138, 139, 182; 524/513; 525/177, 525/437, 444, 445
See application file for complete search history.

(56) References Cited

U.S. PATENT DOCUMENTS

| 5,288,764 A | 2/1994 | Rotter et al. |
| 5,801,206 A | 9/1998 | Khemani et al. |

FOREIGN PATENT DOCUMENTS

| EP | 2613577 | * | 3/2010 |
| WO | WO 97/11126 A | | 3/1997 |

* cited by examiner

*Primary Examiner* — Irina S Zemel
(74) *Attorney, Agent, or Firm* — Modiano & Associati; Daniel O'Byrne; Albert Josif

(57) ABSTRACT

A masterbatch composition comprising an aromatic polyester resin, a polyolefin and a polyfunctional compound selected from the dianhydrides of tetracarboxylic aromatic and/or aliphatic acids and the polyepoxidic compounds, wherein the polyester resin and the polyfunctional compounds are omogeneously dispersed as solids in a matrix formed by the polyolefin, as domains of average particle size less than 800μ. The masterbatch is prepared by milling polyester resins and polyolefin granules to obtain powders having average particle size of less than 200μ, and the powders are therafter homogeneously mixed.

20 Claims, No Drawings

CONCENTRATE OF POLYFUNCTIONAL COMPOUNDS USABLE FOR THE PREPARATION OF FOAMED POLYESTER MATERIALS

The present invention relates to a polymeric concentrate (masterbatch), usable for the production of foamed aromatic polyester resins, capable of imparting to the polyester the rheological properties suitable for the production of foamed articles directly in the foaming process and the process for the production of the masterbatch.

BACKGROUND OF THE INVENTION

The technology widely used for the production in large scale of foamed polyester articles uses as starting material a resin grade which has already intrinsic properties for being foamed, and in that grade, the resin is sold to the producers of foamed articles.

In the patent literature there are described polymeric masterbatches suitable for the production of foamed polyester articles using as starting polyester resin standard bottle grade PET having intrinsic viscosity of about 0.8-0.9 dl/g. None of said masterbatches have, up to now, found industrial scale application due to some drawbacks so far unremoved.

One of said masterbatches is described in EP 0636158; it is obtained by distributing a dianhydride, such as pyromelitic dianhydride (PMDA) in molten PET wherein, during the preparation, some PET branching and some gel formation take place. Sublimation of PMDA also occurs at the extruder die due to the high processing temperature needed to compound the ingredients. The above problems lead to instability in the foaming process with the production of an uneven foam quality. The maximum quantity of PMDA usable is not higher than about 12% of the total masterbatch weight.

Another type of masterbatch is described in U.S. Pat. No. 5,810,206. It is obtained by distributing the PMDA in molten polyolefin at a temperature relatively high at which and at a temperatures subsequently needed in the foaming process ( temperatures as high as 280-300° C.), the polyolefin tends to degrade. Stabilizers are needed to prevent polyolefin degradation. This masterbatch has limitation in the poor PMDA dispersion and in the high amount of polyolefin added to the foamable mixture, which impairs some of the peculiar characteristics of a foamed polyester article, such as the thermal and dimensional stability. Moreover the masterbatch cannot be easily dried prior its use due to sticking problems caused by the low softening point of the polyolefins, which further reduce the efficiency of PMDA in the foaming process.

SUMMARY OF THE INVENTION

It has now been surprisingly found that it is possible to obtain a masterbatch that not only prevents the problems above mentioned, but also allows to significantly improve its performance. The masterbatch is obtained from a mixture of an aromatic polyester, resin, a polyolefin and a polyfunctional compound hereinafter specified, wherein the polymeric components of the mixture are subjected to a specific treatment prior being used for the masterbatch preparation. The polyester and the polyolefin as produced and commercialized are in a granular shape. According to the present invention, the granules are milled to obtain an average particle size of less than 800μ, preferably less than 200μ, with at least 80% of the particles having a size less than 200μ. The milled granules are then mixed with the polyfunctional compound (which is already as powder with particle size less than 200μ) to obtain a homogeneous mixture. The mixture is then dried and used for the masterbatch preparation.

DESCRIPTION OF PREFERRED EMBODIMENTS

In the extruded masterbatch, the polyester resin and the polyfunctional compound are homogeneously dispersed in the polyolefin matrix as domains having a size less than 800μ, preferably less than 200μ with at least 80% of the particles having a size less than 200μ.

Various types of mills can be used for the pretreatment of polymer granules: the preferred one are the ultracentrifugal mills such as the Retsch ZM200 mill manufactured and sold by Retsch.

In that mill the grinding of the pellets occurs by effects of the cutting and shearing generated by the impact of the pellets on a moving rotor provided with blades and a fixed sieve. The material is fed into the rotor from a hopper; the centrifugal acceleration moves the material against the rotor that rotates at extremely high speed (6,000-18,000 rpm). The granules are further pulverized to obtain the size of the sieve holes through which they are forced to pass. Said type of two steps granulation is extremely fast but not destructive of the polymeric properties because the material remains in the mill chamber for few seconds. The milling is preferably carried out in a cryogenic atmosphere to avoid any temperature increase of the material during milling.

After milling, the various components of the masterbatch are mixed in order to obtain homogeneous distribution. Various powder mixing apparatus can be used; a preferred one is the Cavicchi model MM/2A ( manufactured and commercialized by Cavicchi s.p.a.) which is a high speed rotor mixer provided with static mixing elements contributing to obtain homogeneous mixing. The average rotor speed is about 300 rpm.

The first advantage of using the above procedure for preparing the masterbatch is connected with the fact that, being small the size of the particles therein present, the heat transfer from the barrel of the extruder to the material during the extrusion to prepare the masterbatch can be performed at much lower temperatures than those used in the other known processes which need temperatures above 200° C. The melting of the polyolefin occurs also much faster. The fact of having all the components in a powder form allows to obtain very good mixing between the components without having melting of the polyester and PMDA. It is thus possible to intimately contacting PET and PMDA avoiding reaction between them since the processing temperature is much lower than their melting temperature. Uniform PMDA distribution in the polyolefin matrix is also obtained thus avoiding any branching and gelyfication effects and no sublimation of PMDA during the masterbatch preparation. In addition no polyolefin degradation occurs thanks to the low extrusion temperature used.

Still another important advantage is due to the presence of PMDA in the masterbatch as 100% unreacted form and therefore available in that form in the subsequent foaming step.

As further advantage the masterbatch can be dried at a higher temperature than that used for the masterbatch described in U.S. Pat. No. 5,810,206, thanks to the presence of a large amount of crystallized PET.

Finally the thermomechanical properties of the obtained foam are greater than those of the masterbatch of U.S. Pat. No. 5,810,206 due to the lower amount of polyolefin present.

Last but not least, the uniform distribution of PMDA in the polyolefin matrix assures constant reological properties of the polyester during the foaming process with consequent improvement of the properties of the foamed product. The presence of powdered PET in the masterbatch assures uniform distribution of PMDA during the foaming process; this because PMDA is already in close contact with the PET powder, thus facilitating the solubility of PMDA into PET during the foaming process.

The polyfunctional compounds used for the masterbatch preparation are selected from the dianhydrides of the tetra or polycarboxylic aromatics or aliphatic acids and the polyepossidic compounds. The dianhydride of pyromellitic acid is preferred. Examples of other dianhydrides are those of 2,2', 4,4'-difenyltetracarboxylic acid; 3,3',4,4'-benzofenone tetracarboxylic and cyclopentanetetracarboxylic acids.

Representative polyepoxides are diglycidilphthalate, diglycidil ether of bisphenol-A (2,2'-bis(4-hidrossyphenylpropane) and glycerol diglycidylether.

The polyfunctional compounds are used in amount from 5 to 20% by weight of the masterbatch, preferably 10-20%. The polyolefin is used in amount from 25 to 85% by weight of the masterbatch and the polyester resin in amount between 10 and 50% by weight. Preferably, the polyester and the polyolefin are used, each one, in amount of 40-45% by weight (total weight 80-90%) on the weight of the masterbatch.

Polystyrene and the thermoplastic copolymers of styrene can also be present in amount of 10-30% on the weight of the masterbatch.

Examples of polyolefin are LDPE, LLDPE, HDPE, polypropylene and thermoplastic copolymers of propylene such as those of propylene copolymerized with minor amount of ethylene. The polyolefin melt flow index (MFI) is generally between 0.5 and 5.0 g/10' and preferably 0.5 to 2.0 g/10' (ASTM D 1238-56T).

The extrusion of the mixture to obtain the masterbatch in a granular form is performed at a temperature lower than 220° C. preferably at a temperature from 160° to 200° C. and in general at least 60° C. lower than the polyester melting point, and 90° C. lower than the PMDA melting point. The residence time of the materials in the extruder is less than 150 seconds and preferably between 60 and 120 seconds. The amount of masterbatch used for the production of the foamed articles is between 1 and 20% on the weight of the mixture of masterbatch and the polyester to be foamed.

The polyester resin used for the preparation of the masterbatch and of the foamed articles are obtained by polycondensation of bicarboxylic aromatic acids or their derivatives such as the methyl esters with diols with 2-10 carbon atoms.

Therephtalic acid and naphtalendicarboxylic acids are preferred. The preferred diols are ethylene glycol, 1,4 dibutanediol and cyclohexanedimethanol. PET and its copolymers containing up to 20% by weight of units from isophthalic acid or 2.6 naphtalene dicarbossilic acids are preferred.

The intrinsic viscosity of polyester to which the masterbatch is added ranges from 0.5 to 1.0 dl/g. Post consumer and recycled polyester can be used for the foam preparation.

The blowing agents used in the foaming step are the most commonly used such as nitrogen, carbon dioxide, hydrocarbons and fluorohydrocarbons. The amount is between 0.5 and 20% on the weight of the polyester to be foamed.

The masterbatch can contain various additives, such as polyolefin stabilizers, nucleating agents of the polytetrafluoroethylene and perfluoropolyether type having specific surface between 2 and 20 m²/g, talc and flame retardants. The additives are used in amount of 0.1-10% by weight.

The intrinsic viscosity of the polyester is measured dissolving 0.5 g polymer in a 60/40 phenol/tetracloroethane mixture at 25° C. according to ASTM D 4603-86.

The measurement of the mechanical properties of foams is made according to ISO 1922 and UNI 828.

The following examples are illustrative but not limitative of the invention.

EXAMPLES

Example 1

Masterbatch Preparation

A mixture of 44.6 kg/h of PET POLYCLEAR 1101 (dried at 175° C. for 6 h and IV of 0.8 dl/g) produced by INVISTA GmBH, 45 kg/h of LLPDE (MFI 1.2 g/10'), 10 kg/h of PMDA, 0.2% of Irganox 1010 and 0.2% of Polymist 5FA are fed in a corotating twin screw extruder, previously milled in a Retsch ZM200 mill to obtain particles of 200 micron average size and the milled product is subsequent mixed in Cavicchi model MM/2A mixer.

The process conditions for the masterbatch preparation were the following:
  extruder characteristics: corotating twin screw extruder, screw diameter 40 mm; L/D 24
  polymer feeding rate: 100 kg/h;
  screw speed: 120 rpm;
  extrusion temperature: Zone 1: 140° C.
    Zone 2: 180° C.
    Zone 3: 180° C.
    Zone 4: 180° C.
    Zone 5: 180° C.
    Zone 6: 180° C.
    Die temp. 180° C.;
  melt temperature: 175° C.;
  cooling water temperature: 3° C.;
  final moisture of granules after drying: 380 ppm;
  cutting: strand and face cutting;

Example 2

Same procedure as for example 1 but the PET feeding rate was 34.8 kg/h and PMDA feeding rate 20 kg/h. Polymist 5FA was not used.

Example 3

Same procedure as for example 1 but instead of LLDPE, 45 kg/h of LDPE (MFI 1.1 g/10') were used.

Example 4

Same procedure as for example 1 but instead of LLDPE, 45 kg/h of HDPE (MF 11.0 g/10') were used.

Example 5

Same procedure as for example 1 but instead of LLDPE, 45 kg/h of PP were used.

Example 6

Production of Foamed Sheet

Using a twin screw extruder, a foamed PET sheet is produced according to the following procedure:
  Drying at 175° C. for 6 hours (air DEW point: −40° C.) a PET IV 0.8 dl/g (INVISTA POLYCLEAR 1101);

Drying at 80° C. for 8 hours (air DEW point: −40° C.) the masterbatch of example 1;
Extruder: twin screw extruder;
Screw diameter: 60 mm;
Screw L/D: 36;
Polymer feeding rate: 80 kg/h (PET+masterbatch);
Blowing agent: nitrogen 1% weight on the polymer;
Weight ratio PET/Masterbatch: 96/4;
Extrusion temperature: Zone 1: 280° C.
  Zone 2: 285° C.
  Zone 3: 280° C.
  Zone 4: 280° C.
  Zone 5: 275° C.
  Heat exchanger: 725° C.
  Die: 290° C.
  Die pressure: 80 bar
  Die diameter: 60 mm
  Cooling can diameter: 380 mm
  Cooling water temperature: 15° C.;

The obtained foamed sheet shows good cell structure and process stability. Density, cell size, thickness and percentage of crystallinity were measured. And the results are reported in TABLE 1

Example 7

Production of Foamed Sheet

Same procedure as for example 6 but the blowing agent was $CO_2$ fed at 1.2 kg/h rate in respect to the extruded polymer rate.

Example 8

Production of Foamed Sheet

Same procedure as for Example 6 but the blowing agent was 152A (1,1, difluoroethane) fed at 1.6 kg/h rate in respect to the extruded polymer rate. The die pressure was 78 bar.

Example 9

Production of Foamed Sheet

Same procedure as for Example 8 but using the masterbatch of Example 2.

Example 10

Production of Foamed Sheet

Same procedure as for Example 8 but using the masterbatch of Example 3.

Example 11

Production of Foamed Sheet

Same procedure as for Example 8 but using the masterbatch of Example 4.

Example 12

Production of Foamed Sheet

Same procedure as for Example 8 but using the masterbatch of Example 5.

Example 13

Production of Foamed Panel

Using a twin screw extruder, a foamed PET sheet is produced according to following procedure:
Drying at 175° C. for 6 hours (air DEW point: −40° C.) a PET IV 0.8 dl/g (INVISTA POLYCLEAR 1101);
Drying at 80° C. for 8 hours (air DEW point: −40° C.) the masterbatch of the Example 1
Extruder: twin screw extruder;
Screw diameter: 60 mm;
Screw L/D: 36;
Polymer feeding rate: 80 kg/h (PET+masterbatch);
Blowing agent: nitrogen 1% weight on the polymer;
Weight ratio PET/Masterbatch: 96/4;
Extrusion temperature: Zone 1: 280° C.
  Zone 2: 285° C.
  Zone 3: 280° C.
  Zone 4: 280° C.
  Zone 5: 275° C.
  Heat exchanger: 725° C.
  Die: 290° C.
  Die pressure: 72 bar
  Die type: flat die
  Die opening: 200 mm (wide)*0.7 mm (thickness)
  Regulator: moving plate.

The obtained foamed board shows good cell structure and process stability. Density, cell size, thickness, percentage of crystallinity, compression and shear behaviour were measured and the results reported in TABLE 1.

Example 14

Production of Foamed Panel

Same procedure as for Example 13 but using the masterbatch of Example 2. The weight ratio polymer/masterbatch was 98/2; the die pressure was 68 bar.

Example 15

Production of Foamed Panel

Same procedure as for Example 13 but the die was a multi strand type die with 45 holes per row and with 4 rows hole; 2 mm hole diameter. The die pressure was 91 bar.

Example 16

Production of Foamed Panel

Same procedure as for Example 15 but using the masterbatch of Example 5. The weight ratio polymer/masterbatch was 96/4. The die pressure was 91 bar.

Example 17

Production of Foamed Panel

Same procedure as for Example 8 but without using the blowing agent. The extruded material was cut into granules. On the granules, IV and melt strength were measured. (For the melt strength a capillary rheometer Gottfert was used operating at 290° C., piston speed 0.2 mm/sec, die diameter 2 mm). The time (in seconds) necessary for the polymer at 290° C. to cover a distance of 10 cm from the capillary (hanging time) was measured.

The IV was 0.981 dl/g; the melt strength 76 cN and the hanging time 38 seconds.

Example 1 (Comparative)

Same procedure as for Example 8 but the polymeric components were not treated according to the procedure of Example 1 (milling and mixing).

On the obtained granules, IV and melt strength were measured (the latter under the same conditions as in Example 17)

The resultant IV was 0.711 dl/g; the melt strength 46 cN and the hanging time 18 seconds.

Example 2 (Comparative)

Same procedure as for Example 13 but the polymeric components were not treated according to the procedure of Example 1 (milling and mixing). The weight ratio polymer/masterbatch was 98/2; the die pressure 48 bar. The foaming process was unstable and the foam thickness lower than that of Example 13. The properties of the foamed panel were measured and the results reported in TABLE 1.

TABLE 1

| Example | Sheet | Density (g/cm³) | Cell average size (μ) | Thickness (mm) | Crystallinity (%) |
|---|---|---|---|---|---|
| 6 | | 0.320 | 60 | 2.2 | 9 |
| 7 | | 0.180 | 72 | 2.3 | 10 |
| 8 | | 0.112 | 69 | 2.7 | 11 |
| 9 | | 0.121 | 119 | 2.3 | 9 |
| 10 | | 0.121 | 134 | 2.1 | 11 |
| 11 | | 0.111 | 145 | 2.0 | 12 |
| 12 | | 0.121 | 121 | 2.5 | 13 |

| Example | Board | Density (g/cm³) | Cell average size (μ) | Thickness (mm) | Crystallinity (%) | Compression (MPa) M.D. | Shear Modulus (MPA) | Shear Elong. (%) | Dimens Stability At 180° C. (+/− %) |
|---|---|---|---|---|---|---|---|---|---|
| 13 | | 0.098 | 137 | 25 | 28 | 1.6 | 1.4 | 6.2 | 1.1 |
| 14 | | 0.101 | 152 | 25 | 26 | 1.5 | 1.3 | 5 | 0.8 |
| 15 | | 0.092 | 121 | 27 | 27 | 1.2 | 1.2 | 4.9 | 1.0 |
| 16 | | 0.099 | 133 | 26 | 28 | 1.3 | 1.3 | 5.4 | 0.78 |
| 2 (comp) | | 0.123 | 298 | 18 | 31 | 0.98 | 1.0 | 4.1 | 3.3 |

The disclosures in Italian Patent Application No. MI2007A001286 from which this application claims priority are incorporated herein by reference.

What is claimed is:

1. A masterbatch composition comprising
an aromatic polyester resin,
a polyolefin, and
a polyfunctional compound selected from dianhydrides of tetracarboxylic aromatic and/or aliphatic acids,
wherein the polyester resin and the polyfunctional compounds are homogeneously dispersed as solids in a matrix formed by the polyolefin, said polyester resin and said polyfunctional compound being homogeneously dispersed in the polyolefin matrix as domains of average particle size less than 800μ.

2. The masterbatch according to claim 1, wherein at least 80% of the particles of polyester resin have an average size of less than 200μ.

3. The masterbatch according to claim 1, wherein the aromatic polyester resin is polyethylenetherephtalate or its copolymers containing up to 20% of repeating units deriving from isophthalic acid or naphtalenedicarboxylic acids, having intrinsic viscosity from 0.5 to 1.10 dl/g.

4. The masterbatch according to claim 1, wherein the polyolefin is present in amount by weight from 25 to 85%, the polyester resin from 10 to 50% by weight and the polyfunctional compound from 5 to 0.25% by weight on the weight of the masterbatch.

5. The masterbatch according to claim 1, wherein the polyfunctional compound is pyromellitic dianhydride and the polyethylentherephtalate and the polyolefin are present each one in amount of 40-45% by weight on the weight of the masterbatch.

6. The masterbatch according claim 1, wherein the polyepossidic compound is the diglycidil ether of 2,2'-bis(4-hydrossiphenylpropane).

7. The masterbatch according to claim 1, wherein the polyolefin is selected from the group formed of LLDPE, HDPE, LDPE and/or polypropylene and the thermoplastic copolymers of propylene containing lower amounts of ethylene.

8. The masterbatch according to claim 7, wherein the MFI of the polyolefin is from 0.5 to 20 g/10'.

9. The masterbatch according to claim 1, wherein a polyolefin stabilizer is present in amount from 0.1 to 5% by weight.

10. The masterbatch according to claim 1, wherein a nucleant agent selected from polytetrafluoroethylene and perfluoropolyeters having specific surface area of 2 to 20 m²/g is present in amount of 0.01-5% by weight.

11. The masterbatch according to claim 1, wherein a flame retardant is present in amount from 1 to 15% by weight.

12. A process for the production of a masterbatch according to claim 1, wherein polyester resin and the polyolefin granules are milled to obtain powders having average particle size lower than 800μ and the powders are thereafter homogeneously mixed.

13. The process according to claim 12, wherein the homogeneously mixed powder is extruded at a temperature lower than 220° C.

14. The process according to claim 13, wherein the powder is extruded at a temperature between 160° and 200° C.

15. The process according to claim 13, wherein the powder is extruded at temperatures at least 60° C. lower than the melting point of polyethylentherephtalate and at least 90° C. lower than the melting point of PMDA.

16. A process for the production of foamed aromatic polyester resins articles, wherein a polyester resin is mixed in a foaming extruder with a masterbatch according to claim 1 used in amount from 1 to 20% by weight on the weight of the mixture.

17. The process according to claim 16, wherein the polyester resin is a recycled grade resin having intrinsic viscosity from 0.5 to 1.0 dl/g.

18. The process according to claim 16, wherein the polyester resin is polyethylentherephtbalate and the foamed article is a panel with thickness from 2 to 100 mm and density of 4 to 400 kg/m$^3$.

19. The process according to claim 18, wherein the panel has crystallinity higher than 15%.

20. Panels obtained with the process according to claim 18, having density higher than 100 kg/m$^3$, compression greater than 0.4 MPa, shear modulus more than 0.2 MPa and elongation at break from 0.2 to 30%.

\* \* \* \* \*